Oct. 24, 1961   F. LENTZE   3,005,916
DEVICE FOR PHOTOELECTRICALLY SCANNING WEBS
Filed Sept. 26, 1960
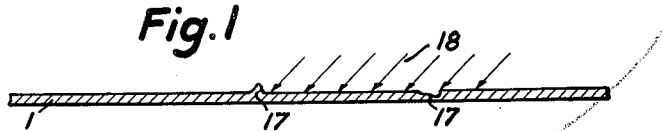
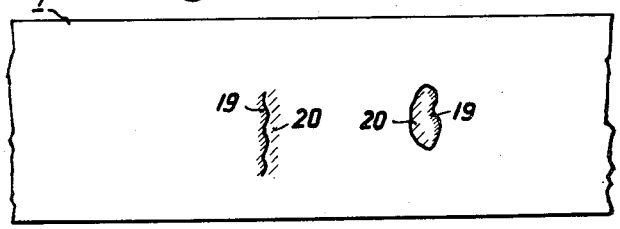
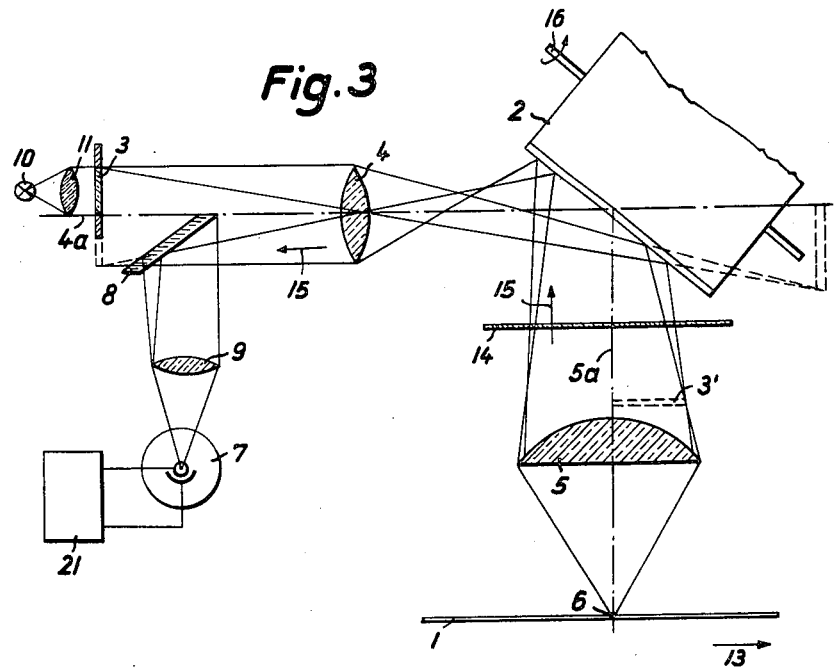
Inventor:
FELIX LENTZE
By Toulmin & Toulmin
Attorneys United States Patent Office 3,005,916
Patented Oct. 24, 1961

3,005,916
DEVICE FOR PHOTOELECTRICALLY
SCANNING WEBS
Felix Lentze, Darmstadt, Germany, assignor to Licentia
Patent-Verwaltungs G.m.b.H., Frankfurt am Main,
Germany
Filed Sept. 26, 1960, Ser. No. 58,498
Claims priority, application Germany Sept. 28, 1959
7 Claims. (Cl. 250—219)

The invention relates to a device for photoelectrically scanning webs, specially moving webs, such as made of paper, textile, or sheet metal.

It is known in the art to photoelectrically scan moving webs for detecting surface irregularities. Such irregularities have to be detected in view of the high quality selection of this material. The requirements with regard to quality and uniformity of such webs and particularly of the surface thereof are steadily increasing. Such requirements have reached the point that even minor uneven surface portions, very small wrinkles, very small cavities etc. have to be detected and registered. The visual or photoelectric inspection of web surfaces and the search for such irregularities is possible only if there is a sufficiently defined brightness contrast. Naturally, such detection is more accurate if such contrast is very great. This contrast in brightness around a faulty spot of a web surface is not only dependent upon the strength of the light source and the inherent reflection characteristics of the web material, but it is also dependent upon the angle of incidence of the light directed towards the web and of the angle of the reflection therefrom. A considerable increase in contrast is obtained if this angle taken with respect to the normal direction of the web is very large i.e. close to 90°, and if the inspection is conducted at an angle which is different therefrom.

It is an object of the present invention to provide a new photoelectrical scanning device utilizing the method of autocollimation.

It is another object of the present invention to provide a new and improved photoelectric scanning device for the detection of surface irregularities in moving webs.

It is a further object of the invention to provide a new and improved apparatus for photoelectrically scanning webs using a combination of autocollimation and optimum angular relations between illumination and light detection.

According to one aspect of the invention in a preferred embodiment thereof it is suggested to provide a slit shaped light source and a lens disposed in the path of the light as emitted from this source. The light directed towards this lens is partially shielded off so that not all of this lens actually produces an image of the slit shaped light source. A rotatable mirror is positioned on the image side of this lens to direct the light towards the moving web to be scanned. A cylinder lens is interposed between the web and the rotatable mirror to virtually contract the light emitted from the image of the slit to a spot; this spot is positioned on the web. The cylinder lens is positioned so that only one half thereof is utilized for the contraction, this half being defined by the center plane of the cylinder lens taken perpendicular to the plane of the web. The light as reflected by the web is monitored and directed towards a photoelectric detector. The monitor device detects only that part of the reflected light which has passed through the other half of the cylinder lens.

While the specification concludes with claims particularly pointing out and distinctly claiming the subject matter which is regarded as the invention it is believed that the invention, the objects of the invention and further objects and advantages thereof will be better understood from the following description taken in connection with the accompanying drawing in which:

FIG. 1 illustrates a cross-sectional view of a web to be scanned by a device according to the invention;

FIG. 2 is a top view of a web illustrated in FIG. 1; and

FIG. 3 is a schematic view of the device according to the invention.

Turning now to the detailed description of the drawings FIG. 1 and FIG. 2 serve to better illustrate the purpose of the invention. A web 1 which, for example, is a paper, a textile, a sheet metal or any other web, is to be inspected as to surface irregularities and faults such as denoted with the reference numeral 17. Such irregularities, for example, are mostly wrinkles or cavities. The web 1 is illuminated with light which is incident upon the web in the direction of the arrows 18. The surface irregularities will appear with a darker and a brighter side. In FIG. 2 reference numeral 19 indicates shaded portions which means portions of the web appearing as having a relatively dark contrast with respect to the average brightness of the light reflected by web 1, while reference numeral 20 denotes portions appearing brighter than the rest of the web surface. It will be apparent that the contrast between the shaded and lightened areas will be very little if the elevations or depressions in the surface of the web are very small. However, as stated above even such minor faults may be of interest if a high grade quality of the web is needed or desired.

The device according to the invention now is capable of detecting such brightness contrasts even if they are extremely small. In other words the device according to the invention increases the detectability of faults in the surface structure of a web.

Turning now to the FIG. 3, reference numeral 10 denotes an ordinary light source illuminating a slit 3 via a condenser lens 11. The slit 3 is shown in cross-sectional view and it has its primary extension in the plane of the drawing. Slit 3 also extends in its primary direction within the upper half of the optical plane of an optic 4 which may be a single lens or a higher corrected lens system. The optical axis of lens 4 is denoted with 4a and the slit 3 extends from this optical axis 4a in outward (in the drawing upward) direction. Slit 3 thus is asymmetrically positioned with respect to axis 4a. Optic 4 produces an image of slit 3 indicated as 3'. A rotatable mirror 2 is positioned on the image side of optic 4. Mirror 2 preferably has several plane, reflecting surfaces, and it is rotatably mounted having a rotating shaft 16. The axis of shaft 16 is inclined with respect to axis 4a. This axis of shaft 16 preferably is positioned in the optical plane as defined by optical axis 4a and slot 3, which is the plane of the drawing. A cross-section through mirror 2 taken in a plane perpendicularly to shaft 16 might produce a triangular, a squarical, a pentagonal or any other kind of regular geometrical configuration. A cylinder lens 5 is positioned between the image 3' and the web 1 so that the image 3' of slot 3 is contracted to a light spot 6 thereon. Reference numeral 5a denotes the center plane of cylinder lens 5 being positioned perpendicularly to the plane of the drawing. Center plane 5a defines two portions of the cylinder lens the importance of which will be explained later in this specification. The web moves in the direction of arrow 13.

Light reflected by the web 1 passes through cylinder lens 5 and meets the mirror 2; from there the light is reflected so as to pass again through optic or lens 4 and it is deflected again by a stationary mirror 8 which has an inclined position with respect to optical axis 4a. A photoelectric receiver 7 receives the light reflected by mirror 8 through an optical system 9. The mirror 8 will be positioned perpendicularly to the plane of the drawing if the photo-electric receiver 7 is also positioned in this plane. The photoelectric receiver 7 can be of any kind and preferably is a photomultiplier. 21 is an indicator of any kind fed by the output produced by receiver 7.

The mirror 8 has another function in this system as illustrated; it incidentally serves also as a mask or diaphragm so that primarily the upper half of lens 4 is actually utilized to produce the image 3' of slit 3.

In view of the asymmetrical position of slit 3 with respect to lens 4, only the right hand half of cylinder lens 5 is used to produce the spot 6. On the other hand, mirror 8 directs only such light to receiver 7 which has passed through the (in the drawing) lower half of lens 4, and only light which has passed through the left hand portion of cylinder lens 5 is directed by mirror 2 towards this lower half of lens 4. In other words only light reflected by the web 1 and passing through the left hand portion of cylinder lens 5 will reach the photo receiver 7 via mirror 2, lens 4, mirror 8 and lens 9, while light reflected by web 1 not passing through this left hand portion of cylinder lens 5 will not reach the photoelectric receiver 7.

This system, as described, produces an average angle between the light directed towards web 1 and the light reflected by web 1 to be used for the detection of surface impurities. At the same time use is made of the method of autocollimation which is of high advantage with respect to maximum efficiency of the optical system employed.

It will be observed that, of course, an additional mask can be used to insure that only the upper portion of lens 4 is used for the production of image 3', however, it is apparent that the simultaneous utilization of mirror 8 as mask simplifies the construction of the device according to the invention.

Upon rotation of mirror 2 about the axis of shaft 16, the light spot 6 is moved in a direction perpendicularly to the plane of the drawing which direction is also perpendicular to the direction of the movement of web 1.

An optical element 14 is interposed between mirror 2 and cylinder lens 5. This element 14 is illustrated in FIG. 3 as a transparent plate extending in the plane perpendicularly to the plane of the drawing as well as to the plane 5a. This plate 14 is characterized by a variable refractory index and it serves the following purpose. In the drawing it is indicated that the spot 6 is just about also in the plane of the drawing. However, upon rotation of mirror 2 it will be deflected in a direction perpendicular to the plane of the drawing as stated above. Consequently, there is a steadily varying difference in light path length of the reflected light from the spot on the web 1 where it is reflected into the optical system. If the plate 14 has a refractory index which has its maximum value in the plane of the drawing while the refractory index of this plate increases in the direction upwardly or as well as in the direction downwardly taken from the plane of the drawing, this difference in light path can be balanced and corrected.

The invention is limited to the embodiment described above but all changes and modifications thereof not constituting departures from the spirit and scope of the invention are intended to be covered by the following claims.

I claim:

1. Device for photoelectrically scanning webs comprising: a slit shaped light source; optical means positioned in the path of the light of said light source producing an image thereof; a cylinder lens having a center plane defining two portions, one of said portions being disposed in said light path for contracting said image to a spot; optical means in said light path for moving said spot over the surface of the web to be scanned; and photoelectric means for detecting the light reflected by said web and having passed through the other portion of said cylinder lens as defined by said center plane.

2. Device for photoelectrically scanning webs comprising: a slit shaped light source; a lens positioned in the path of said light from said source producing an image of said slit; a cylinder lens having two symmetrical portions and being positioned adajacent the web to be scanned, and one of said portions being positioned in the path of said light producing a light spot on the surface of the web; a movable mirror positioned in the path of said light between said lens and said cylinder lens, for moving said light spot across said web; and photoelectric means for detecting only the light reflected by said web which has passed through the other portion of said cylinder lens.

3. Device for photoelectrically scanning webs comprising: a lens means; a slit shaped light source extending from the optical axis of said lens means perpendicularly thereto, said lens means producing an image of said slit; a rotatable mirror positioned on the image side of said lens means for variably deflecting said light; a cylinder lens positioned adjacent the web to be scanned, said deflected light passing through one half of said cylinder lens whereby a light spot is produced on said web, said half being defined by the symmetrical plane of said cylinder lens; and photoelectric detector means positioned in the path of the light as reflected by said web and having passed through the other half of said cylinder lens and a limited portion of said lens means.

4. Device as set forth in claim 3 comprising, in addition, a means interposed in the path of said light as directed towards said web and reflected by said web for correcting the difference in a light path length occurring during the movement of said spot acoss said web upon rotation of said mirror.

5. Device as set forth in claim 3 said photoelectric detector means including, a mirror positioned so as to deflect said light after having passed through said lens means, an objective positioned in the path of the light as deflected by said last mentioned mirror, and a photoelectric receiving element for detecting the light having passed through said last mentioned objective.

6. Device for photoelectrically scanning webs comprising: an optical system capable of producing a movable light spot on the web and including a lens, a rotatable mirror and a cylinder lens positioned so as to define a common light path, said cylinder lens being positioned adjacent said web; a slit shaped light source positioned adjacent said lens in asymmetrical relationship to the optical axis of said lens and producing the light for said spot; and a photoelectric detecting device disposed in said light path, adjacent said lens so as to detect light reflected by said web but having passed through a limited portion of said cylinder lens.

7. Device for photoelectrically scanning a moving web comprising: in a common light path, a slit shaped light source, a lens asymmetrically positioned with respect to said slit having its optical axis perpendicular to the extension of said slit, a rotatable mirror having its axis of rotation in inclined relationship to said optical axis, a cylinder lens having a center plane which is inclined to said axes said cylinder lens directing a movable light spot towards said web; a stationary mirror positioned adjacent said lens at the same side as said light source and further positioned in the path of light which is reflected by said web and is passing through said cylinder lens at one side of said center plane; and a photoelectric receiver in the path of the light deflected by said stationary mirror.

References Cited in the file of this patent

UNITED STATES PATENTS

| | | |
|---|---|---|
| 2,719,235 | Emerson | Sept. 27, 1955 |
| 2,975,289 | Robert et al. | Mar. 14, 1961 |
| 2,976,362 | Stamps | Mar. 21, 1961 |